United States Patent Office 3,842,143
Patented Oct. 15, 1974

3,842,143
PROCESSABLE POLYIMIDES AND POLYAMIDE-IMIDES CONTAINING POLYOLEFINIC UNSATURATED IMIDES
Roland A. E. Winter, Armonk, N.Y., assignor to Ciba-Geigy Corporation, Ardsley, N.Y.
No Drawing. Filed Nov. 2, 1972, Ser. No. 303,299
Int. Cl. C08g 41/04
U.S. Cl. 260—857 PA                17 Claims

ABSTRACT OF THE DISCLOSURE

This invention provides compositions containing amine terminated polyimides, polyamide-imides or the corresponding polyamide-acids in combination with reactive polyolefinic compounds and the cross-linked polymers obtained therefrom.

These polyolefinic compounds facilitate processing of the prepolymer resin by lowering the softening temperature, under processing conditions, chain-extend and cross-link the base resin.

BACKGROUND OF THE INVENTION

Many previously known polyimide and polyamide-imide resins suffer from their inability to be processed at elevated temperatures. These resins are often characterized by their insolubility and infusibility properties which make them practically impossible to process with conventional plastics process equipment. As a consequence, the resins are usually handled in the form of their precursor polyamide acids. The precursor materials, while suitable for the preparation of thin films prepared from solution, cannot be handled by autoclaving and press molding techniques without great difficulty. The polyamide acid forms of both the polyimide and polyamide-imide resins undergo cyclization to the imide form during processing, giving rise to poorly consolidated and void filled parts of low mechanical strength.

It has now been found, that by the addition of certain reactive polyolefinic compounds to polyimide and polyamide-imide prepolymers or their corresponding polyamide acids containing amine end groups, that it is possible to process these materials using conventional plastic processing techniques such as autoclave and vacuum bag laminating, compression and injecting molding. These additives while lowering the softening temperature of these prepolymers, also chain-extend and cross-link the base resin to give useful objects which possess good mechanical and thermooxidative properties as well as low void content.

DETAILED DISCLOSURE

This invention provides compositions containing amine terminated prepolymers in combination with a reactive polyolefinic compound, and the crosslinked polymers obtained therefrom.

More particularly, this invention provides a composition comprising a prepolymer resin selected from amine terminated polyimides and polyamide-imides or their corresponding polyamide-acid precursor and from about 0.5 to 5.0 mole equivalents of a polyolefinic compound per mole of prepolymer.

The crosslinked polymers of this invention are obtained by reacting the amine terminated prepolymers, i.e., polyimides, polyamide-imides, or polyamide-acid with 0.5 to 5.0 mole equivalents per mole of prepolymer of a polyolefinic additive at a temperature of from 100° C. to 350° C.

These additives facilitate processing of the prepolymer resin by lowering the softening temperature, under processing conditions, chain-extend and cross-link the base resin through addition reactions without evolution of volatile by-products. Conventional plastic processing techniques such as autoclave and vacuum bag laminating, compression and injection molding can be used to fabricate objects which possess good mechanical and thermooxidative properties as well as low void content.

The chain extended and crosslinked resins of this invention are used as adhesives, laminating resins, coatings for decorative and electrical purposes and molding compounds.

The polyolefinic additives are compounds which contain at least two unsaturated functional groups capable of reacting with amino groups through Michael addition.

Particularly useful polyolefinic additives are unsaturated imides having the formula

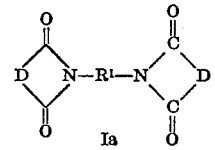

or

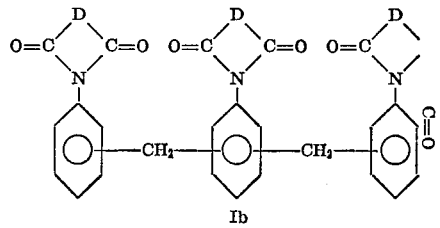

wherein $R^1$ is a divalent organic radical containing at least two carbon atoms which may be selected from aromatic, aliphatic, cycloaliphatic and heterocyclic radicals, combinations of these, and radicals with heteroatom-containing bridging groups where the heteroatom in the bridge is oxygen, sulfur, nitrogen, silicon or phosphorus, D is a divalent radical containing olefinic unsaturation having the formula

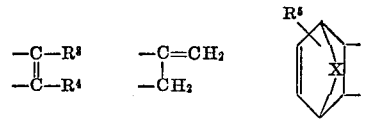

wherein $R^3$ is hydrogen, methyl, bromo or chloro;
$R^4$ is hydrogen, bromo or chloro,
$R^5$ is hydrogen or methyl,
X is oxygen or methylene.

The radicals $R^1$ are divalent organic radicals derived from diprimary diamines. More particularly, the divalent organic radicals as represented by $R^1$ are alkylene groups containing from 2 to 12 carbon atoms; cycloalkylene groups containing from 4 to 6 carbon atoms; a xylylene group, arylene groups selected from ortho, meta or para phenylene, xylene, tolylene, biphenylene, naphthylene; a substituted arylene group of the formula

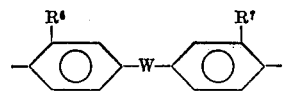

wherein W is sulfur, carbonyl, —NH, —N—(lower) alkyl, O, S, SS, —N— phenyl, sulfonyl, a linear or branched alkylene group of from 1 to 3 carbon atoms, $R^6$ and $R^7$ are independent and each is hydrogen, chloro or bromo, lower alkyl from 1 to 5 carbon atoms, lower alkoxy containing from 1 to 5 carbon atoms; or a group having the formula

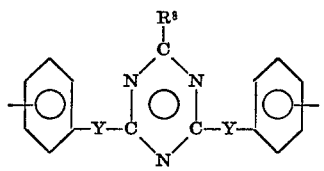

where Y is a covalent bond or NH— and $R^8$ is phenyl, piperidino, H, diphenylamino, or a di(lower alkyl) amino group and said alkyl containing from 1 to 5 carbon atoms.

The radical D is derived from an ethylenically unsaturated anhydride of the formula

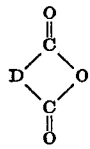

II wherein D is as defined hereinbefore, which may be, for example, maleic anhydride, citraconic anhydride, chloro maleic anhydride, dichloro maleic anhydride, bromo maleic anhydride, and the products of a Diels-Alder reaction between a cyclodiene of the formula

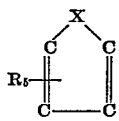

wherein X and $R^5$ are as defined hereinbefore and maleic anhydride, itaconic anhydride and the like.

The unsaturated imide additives of the formula I are prepared by first forming the amide-acid by reacting amines of the formula

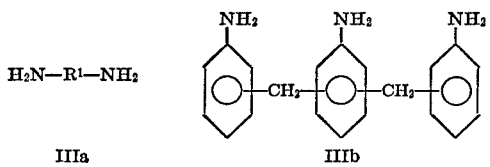

IIIa          IIIb wherein $R^1$ is as defined hereinbefore with an unsaturated anhydride of formula II in an inert solvent such as chloroform at about 25° C. with subsequent cyclization and dehydration of the amide-acid to the imide by thermal or chemical means. Thus, these additives may be immidized by heating the amide-acids at a temperature sufficient to effect immidization while removing the water formed by azeotropic distillation, e.g., by refluxing in toluene at 110° C., or adding acetic anhydride/pyridine mixture to the amide-acid in chloroform. The preparation of these compounds are described in more detail in U.S. Pat. 2,444,536.

These additives may be incorporated into the resin any time prior to the final processing thereof. Thus, the unsaturated imide additives may be added to the resins before, during and after polymerization or to the resin powder which resin powder may be in an imidized form or amide-acid precursor form by mechanical mixing methods known in the art.

These additives may be incorporated into the resinous material in amounts ranging from 0.5 to about 5 mole equivalents per mole of base resin. The preferred range is from 0.5 to about 2 moles of additive per mole of base resin.

The amine terminated base resins which may be processed in presence of the unsaturated imide additives or their corresponding amide-acid precursors include a polyamide-acid of the formula

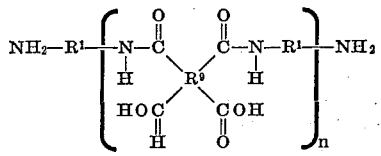

IV and its corresponding polyimide of the formula

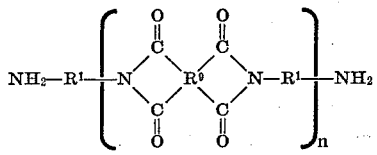

V as well as a polyamide-amide acids of the formula

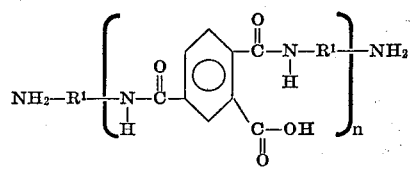

VI and

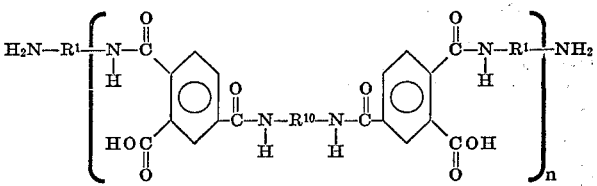

VII and their respective corresponding polyamide-imide of the formulas

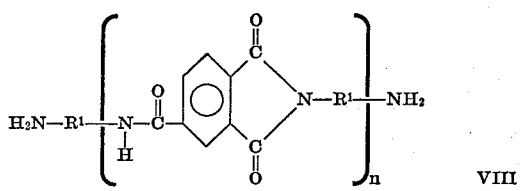

VIII and

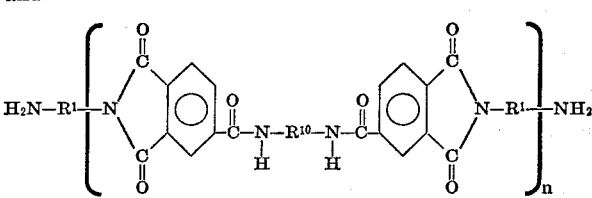

IX wherein $R^1$ is as previously defined herein;
$R^9$ is a tetravalent aliphatic, cycloaliphatic, aromatic or heterocycle radical containing at least 2 carbon atoms;
$R^{10}$ is a divalent organic radical of the scope defined by $R^1$.
$n$ is an integer of from 1 to 100 and more preferably from 1 to 15;

More particularly, $R^9$ is derived from a dianhydride characterized by the general formula

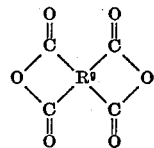

X and may be a straight or branched chain saturated aliphatic radical having from 2 to 4 carbon atoms, a saturated alicyclic radical having 5 to 12 carbon atoms in the ring, a heterocyclic radical containing at least one of the atoms of O, N, and S, and an aromatic group containing at least one ring of six carbon atoms, said ring characterized by benzenoid unsaturation, the four carbonyl groups being attached directly to separate carbon atoms in a six membered benzenoid ring of the $R^9$ ring characterized by benzenoid unsaturation, the four radical and each pair of carbonyl groups being attached to adjacent carbon atoms in a ring of the $R^9$ radical and may be characterized by the following structures

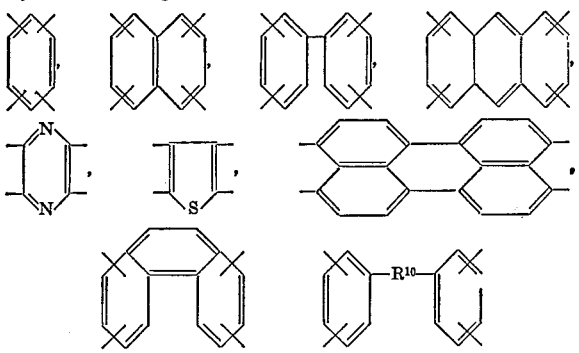

wherein $R^{11}$ is selected from the group consisting of

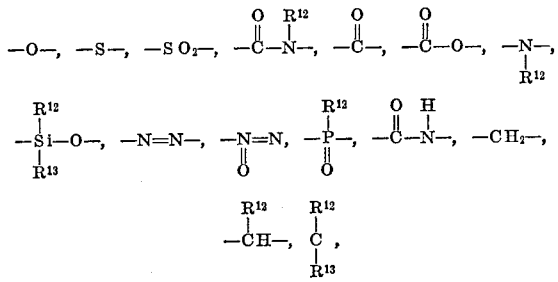

wherein $R^{12}$ and $R^{13}$ are alkyl of from 1 to 6 carbon atoms or aryl such as phenyl and substituted groups thereof, and radical having the structure

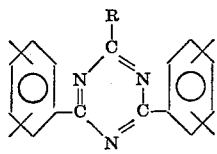

wherein $R^{14}$ is hydrogen, aryl such as phenyl and naphthyl; amino, diarylamino such as diphenylamino, dialkylamino such as dimethyl or diethylamino and the like. These latter type triazine based dianhydrides are described in greater detail in an application filed on May 1, 1972, Ser. No. 248,838 (Case GC 600).

In these dianhydrides every carbonyl group is attached directly to a separate carbon atom of the aromatic radical the carbonyl groups being *ortho* or *peri* to each other so that 5- or 6-membered anhydride rings are formed respectively.

The preferred aromatic dianhydrides are those in which the carbon atoms of each pair of carbonyl groups are directly attached to ortha carbon atoms in the R group to provide a 5-membered ring as follows:

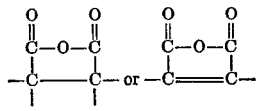

Suitable dianhydrides that are used alone or in a mixture are, among others:

Pyromellitic dianhydride
2,3,6,7-Naphthalenetetracarboxylic dianhydride
3,3',4,4'-Diphenyltetracarboxylic dianhydride
1,2,5,6-Naphthalenetetracarboxylic dianhydride
2,2',3,3'-Diphenyltetracarboxylic dianhydride
2,2-Bis-(3,4-dicarboxyphenyl)propane dianhydride
Bis-(3,4-dicarboxyphenyl)sulfone dianhydride
3,4,9,10-Perylenetetracarboxylic dianhydride
Bis-(3,4-dicarboxyphenyl)ether dianhydride
Ethylenetetracarboxylic dianhydride
Naphthalene-1,2,4,5-tetracarboxylic dianhydride
Naphthalene-1,4,5,8-tetracarboxylic dianhydride
Decahydronaphthalene-1,4,5,8-tetracarboxylic dianhydride
4,8-Dimethyl-1,2,3,5,6,7-hexahydronaphthalene-1,2,5,6-tetracarboxylic dianhydride
2,6-Dichloronaphthalene-1,4,5,8-tetracarboxylic dianhydride
2,7-Dichloronaphthalene-1,4,5,8-tetracarboxylic dianhydride
2,3,6,7-tetrachloronaphthalene-1,4,5,8-tetracarboxylic dianhydride
Phenanthrene-1,8,9,10-tetracarboxylic dianhydride
Cyclopentane-1,2,3,4-tetracarboxylic dianhydride
Pyrrolidine-2,3,5,5-tetracarboxylic dianhydride
Pyrazine-2,3,5,6-tetracarboxylic dianhydride
2,2-Bis-(2,5-dicarboxylic)propane dianhydride
1,1-Bis-(2,3-dicarboxyphenyl)ethane dianhydride
Bis-(2,3-dicarboxyphenyl)methane dianhydride
Bis-(3,4-dicarboxyphenyl)methane dianhydride
Bis-(3,4-dicarboxyphenyl)sulfone dianhydride
Benzene-1,2,3,4-tetracarboxylic dianhydride
1,2,3,4-Butanetetracarboxylic dianhydride
Thiophene-2,3,4,5-tetracarboxylic dianhydride
3,3',4,4'-Diphenyltetracarboxylic dianhydride
3,4,3',4'-Benzophenonetetracarboxylic dianhydride
Azobenzenetetracarboxylic dianhydride
2,3,4,5-Tetrahydrofuran dianhydride
2-phenyl-4,6-bis(3',4'-dicarboxyphenyl)-s-triazine dianhydride
2-diphenylamino-4,6-bis(3',4,-dicarboxyphenyl)-s-triazine dianhydride Among the diprimary diamines which are suitable for preparing the olefinic compounds of formula II and resins of the present invention and also from which $R^1$ and $R^{10}$ are derived include the following:

4,4'-Diamino-2,2'-sulfonediphenylmethane
Ethylenediamine
*m*-Phenylenediamine
*p*-Phenylenediamine
4,4'-Diaminodiphenylpropane
4,4'-Diamonodiphenylmethane
Benzidine
4,4'-Diaminodiphenyl sulfide
4,4'-Diaminodiphenylsulfone
3,3'-Diaminodiphenylsulfone
4,4'-Diaminodiphenyl ether
4,4'-Diaminobenzophenone
Bis-(4-aminophenyl)-N-methylamine
1,5-Diaminonaphthalene
3,3'-Dimethyl-4,4'-diaminobiphenyl
3,3'-Dimethoxybenzidine
Toluenediamine
Methylene bis(o-chloroaniline)
Methylene bis(o-methoxyaniline)
Methylene bis(o-methylaniline)
*m*-Xylylenediamine
*p*-Xylylenediamine
Bis-(4-aminocyclohexyl)-methane
Hexamethylenediamine
Heptamethylenediamine
Octamethylenediamine
Nonamethylenediamine
Decamethylenediamine
3-Methyl-heptamethylenediamine 4,4′-Dimethylheptamethylenediamine
2,11-diaminododecane
2,2-Dimethylpropylenediamine
3-Methoxyhexamethylenediamine
4,4′-(p-aminophenyl)disulfide
2,5-Dimethylhexamethylenediamine
2,5-Dimethylheptamethylenediamine
5-Methylnonamethylenediamine
1,4-Diaminocyclohexane
1,12-Diaminooctadecane
2,5-Diamino-1,3,4-oxadiazole
$H_2N(CH_2)_3O(CH_2)_2O(CH_2)_3NH_2$
$H_2N(CH_2)_3S(CH_2)_3NH_2$
$H_2N(CH_2)_3N(CH_3)(CH_2)_3NH_2$
2-diphenylamino-4,6-bis(m-aminoanilino)-s-triazine
2-amino-4,6-bis(m-aminoanilino)-s-triazine
2-phenyl-4,6-bis(p-aminophenyl)-s-triazine
2-phenyl-4,6-bis(m-aminophenyl)-s-triazine
2-phenyl-4,6-bis(4′-aminoanilino)-s-triazine
2-phenyl-4,6-bis(3′-aminoanilino)-s-triazine
2-anilino-4,6-bis(4′-aminoanilino)-s-triazine
2-(N-methylanilino)-4,6-bis(3′-aminoanilino)-s-triazine
2-dimethylamino-4,6-bis(3′-aminoanilino)-s-triazine
2-diphenylamino-4,6-bis(2′-aminoanilino)-s-triazine
2-diphenylamino-4,6-bis(4′-aminoanilino)-s-triazine
2-phenyl-4,6-bis(2′-methyl-4′-aminoanilino)-s-triazine
2-diphenylamino-4,6-bis(3′-aminocyclohexylamino)-s-triazine
2H,4,6-piperidino-4,6-bis(3′-aminoanilino)-s-triazine
2,4-bis(3′-aminoanilino)-s-triazine
2-amino-4,6-bis(3′-aminoanilino)-s-triazine
2-diphenylamino-4,6-bis[4-(p-aminophenoxy)anilino]-s-triazine The polyamide-acids of Formula IV may be prepared by reacting, generally at between 20° C. and 120° C. in an anhydrous polar solvent such as tetrahydrofuran, dioxane, dimethylformamide, dimethylacetamide, dimethylsulfoxide, N-methylpyrollidone or pyridine, a dianhydride or mixture of two or more dianhydrides of formula X with an excess of a diprimary diamine or a mixture of two or more diprimary diamines of formula III.

The polyamide-amide-acids of formula VI may be prepared by reacting trimellitic anhydride or a derivative thereof, such as for example the acid chloride with an excess of a diprimary diamine or mixture of diprimary diamine of formula III and an anhydrous polar solvent such as dimethylformamide, N,N-dimethylacetamide, dimethylsulfoxide, N-methylpyrollidone, pyridine, tetrahydrofuran or dioxane.

The polyamide-amide acids of formula VII may be prepared by reacting an amide dianhydride of the formula

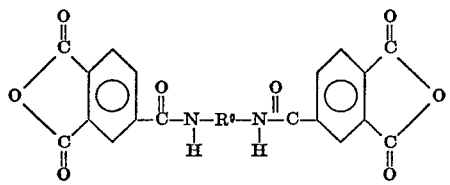

wherein $R^9$ is as defined hereinbefore, with a molar excess of a diprimary diamine of formula III in an anhydrous polar solvent such as dimethylformamide, dimethylacetamide, dimethylsulfoxide, N-methylpyrollidone.

The quantities of anhydride and diprimary diamine to prepare the amine terminated polymer resins as so chosen that the ratio $$\frac{\text{Number of moles of diamine}}{\text{Number of moles of anhydride}}$$

is in a range of from 2:1 to 1.01:1 more preferably from 2:1 to 1.1:1.

The polyamide-acid precursor resins of formulas IV, V and VI have very good solubility in polar organic solvents such as Dimethylsulfoxide
N-methyl-2-pyrollidone
Tetramethyl urea
Pyridine
Dimethylsulfone
Hexamethylphosphoramide
Tetramethylene sulfone
Formamide
N-methylformamide
Butyrolactone
Dimethylformamide
Dimethylacetamide
Dioxane
Tetrahydrofuran The solvents can be used alone, in combination with other solvents, or in combination with poor solvents such as benzene, benzonitrile, dioxane, xylene, toluene and cyclohexane.

Solutions may be prepared containing up to 50% by weight of the polyamide-acid precursor resins and additives combined. The resins and additives may be used directly from solution to form laminates, coatings for decorative and electrical purposes, films, and adhesives. The polyamide-acid precursors and the additives may be precipitated from their solutions by a diluent such as water, a hydrocarbon or a ketone such as acetone. The powders thus obtained may be further processed using conventional plastic processing methods such as autoclave molding, vacuum bag molding, compression, transfer injection molding. Alternatively, the polyamide-acid resin precursors may be precipitated from solution and the additive added to the resin powder after which the mixture is further processed.

The conversion of the polyamide acid precursors of formulas IV, VI AND VII into their corresponding polyimide of formula V and polyamide-imides of formulas VIII and IX respectively may be affected by heating the precursor resins or their solutions between 80° C. and 200° C.

The additives may be added to the dry isolated powdered polyimides or the polyamide-imides by standard blending techniques and fabricated as discussed above. For those particular polyimides of formula V and the polyamide-imides of formulas VIII and IX which are soluable in the aforementioned polar solvents, the additives may be added to a solution of imidized resin and the resin fabricated into laminates, coatings, adhesives, molding compositions, etc.

Other appropriate ingredients may be added to the compositions of this invention such as fillers, dyes, pigments, thermal and UV stabilizers and the like, depending on the end use.

To further illustrate the nature of this invention and the process employed in preparing the chain extended and crosslinked resins, the following examples are given below.

EXAMPLE 1

N,N′-p-aminophenyl sulfone bis(bicyclo [2.2.1]hept-5-ene-2,3-dicarboxylic imide)

A three neck, 200 ml. flask equipped with a stirrer, addition funnel, heating mantle and Dean-Stark trap was charged with 100 ml. of toluene and 32.8 gm. (0.20 mole) 5-norbornene-2,3-dicarboxylic anhydride (Nadic anhydride). The mixture was heated to reflux, giving a clear solution. A solution of 24.8 gm. (0.10 mole) of 4,4′-diaminodiphenylsulfone in 50 ml. of DMF was then added dropwise to the reaction flask over 1 hour. The mixture was maintained at reflux until the theoretical amount of water had been collected in the Dean-Stark trap (approximately 4 hours). Toluene was then allowed to distill off until a heavy slurry was obtained. The slurry was removed from the flask, triturated with toluene, filtered and vacuum dried. A white solid was obtained which had a melting point of 312°–315° C.

In a similar manner, by substituting for 4,4'-diaminodiphenylsulfone an equivalent amount of the following diamines (a) 4,4'-diaminodiphenylsulfide
(b) 4,4'-diaminodiphenylmethane
(c) 2,4-toluenediamine
(d) m-phenylenediamine
(e) 4,4'-diaminodiphenyl ether
(f) p-phenylenediamine
(g) 3,3'-diaminodiphenylsulfone
(h) 1,6-diaminohexane
(i) 2,6-bis-(2-aminophenyl)aniline
(j) 4,4'-(p-aminophenyl)dissulfide
(k) 2-diphenylamino-4,6-bis(m-aminoanilino)-s-triazine there is respectively obtained the following:

(a) N,N'-p-aminophenylsulfide bis(5-norbornene-2,3-dicarboxylic imide) m.p. 265°–266° C.
(b) N,N'-2,4-diaminotoluene bis(5-norbornene-2,3-dicarboxylic imide) softens at 75° C.
(c) N,N'-m-phenylene diamine bis(5-norbornene-2,3-dicarboxylic imide) m.p., 247° C.–248° C.
(d) N,N'-p-aminophenylether bis(5-norbornene-2,3-dicarboxylic amide) m.p. 266° C.–267° C.
(e) N,N'-p-phenylenediamine bis(5-norbornene-2,3-dicarboxylic imide) m.p. >400° C.
(f) N,N'-m-aminophenylsulfone bis(5-norbornene-2,3-dicarboxylic imide) m.p. 265° C.–266° C.
(g) 1,6-diaminohexane bis(5-norbornene-2,3-dicarboxylic imide) m.p. 134° C.–137° C.
(h) 1,3-xylene diamine bis(nadimide)
(i) 2,6-bis-(2-aminophenyl)aniline bis(5-norbornene-2,3-dicarboxylic amide) m.p. 235° C.–238° C.
(j) 4,4'-(p-aminophenyl dissulfide)bis(5-norbornene-2,3-dicarboxylic imide) m.p. 198° C.–200° C.
(k) N,N'-bis{2-phenylamino-4,6-bis-(m-amino-anilino)triazine}bicyclo[2.2.1]hept-5-ene-2,3-dicarboxylic imide m.p. 148° C.–150° C.

EXAMPLE 2

By essentially following the procedure of Example 1 and substituting for the 4,4'-diaminodiphenylsulfone and Nadic anhydride an equivalent amount of the following diprimary diamines and unsaturated anhydrides (a) 4,4'-diaminodiphenylmethane + 5-methyl-5-norbornene-2,3-dicarboxylic anhydride (Methyl Nadic anhydride)
(b) 4,4'-diaminodiphenylether + 5-methyl-5-norbornene-2,3-dicarboxylic anhydride
(c) m-phenylenediamine + 5-methyl-5-norbornene-2,3-dicarboxylic anhydride there is respectively obtained the following compounds:

(a) N,N'-p-aminophenylmethane bis(5-methyl-5-norbornene-2,3-dicarboxylic imide) softening point, 90° C.
(b) N,N'-p-aminophenylether bis(5-methyl-5-norbornene-2,3-dicarboxylic imide) softening point, 1–4° C.
(c) N,N'-m-phenylene diamine bis(5-methyl-5-norbornene-2,3-dicarboxylic imide) softening point, 80° C.

EXAMPLE 3 m-Phenylene diamine bis(maleimide)

To a 3 neck, 200 ml. flask equipped with stirred and water bath was added 17.7 gm. (0.16 mole) of m-phenylene diamine, 15 gm. (0.18 mole) of anhydrous sodium acetate and 50 ml. of DMF. The mixture was heated to 48° C. To the resulting slurry was added 32 gm. (0.34 mole) of maleic anhydride, forming a clear yellow solution. After about 5 minutes, 42 gm. (0.41 mole) of acetic anhydride was added. Stirring was continued for 3 hours at 45° C., after which time a heavy yellow slurry had formed. The mass was poured into a rapidly stirred ten fold excess of water. The bright yellow solid obtained was filtered off and vacuum dried and had a melting point of 197°–199° C.

In a similar manner, by substituting for m-phenylene diamine an equivalent amount of the following amines (a) 4,4'-diaminodiphenylether
(b) 4,4'-diaminodiphenyl
(c) 4,4'-diaminodiphenylsulfone
(d) 4,4'-diaminodiphenylsulfide
(e) ethylenediamine
(f) 4,4'-diaminodiphenylmethane
(g) 2,4-toluenediamine there is respectively obtained the following compounds:

(a) 4,4'-diaminodiphenylether bis(maleimide)
(b) 4,4'-diaminodiphenyl bis(maleimide)
(c) 4,4-diaminodiphenylsulfone bis(maleimide)
(d) 4,4'-diaminodiphenylsulfide bis(maleimide)
(e) ethylenediamine bis(maleimide)
(f) 4,4'-diaminodiphenylmethane is(maleimide) m.p. 150° C.–152° C.
(g) 2,4-toluenediamine bis(maleimide) m.p. 197° C.–198° C.

EXAMPLE 4

By essentially following the procedure of Example 3 and substituting for the m-phenylene diamine and maleic anhydride and equivalent amount of the following amines and unsaturated anhydrides (a) 4,4'-diaminodiphenylether + dichloro maleic anhydride
(b) 4,4'-diaminodiphenylether + citraconic anhydride
(c) 4,4'-diaminodiphenylether + 7 - oxabicyclo [2.2.1] hept-5-ene-2,3-dicarboxylic anhydride (oxynadimide)

there is respectively obtained the following compounds:

(a) 4,4'-diaminodiphenylether bis(dichloromaleimide)
(b) N,N'-p-aminophenylether bis(citraconimide)
(c) N,N'-p-aminophenylether bis(7 - oxabicyclo [2.2.1] hept-5-ene-2,3-dicarboxylic imide)

EXAMPLE 5

4,4'-diaminodiphenylmethane and Nadic anhydride were dissolved in dimethyl formamide under a nitrogen atmosphere at about 25° C. To this solution was added portionwise 3,3',4,4'-benzophenone tetracarboxylic dianhydride. The reaction mixture was stirred for several hours and a clear viscous solution was obtained. The mole ratio of 4,4'-diaminodiphenylmethane, Nadic anhydride and benzophenone dianhydride was 1.5:1:1 respectively. The solids were adjusted to yield a final resin solution of about 40% solids. The polymer powder was obtained by spray drying.

The resin powder obtained had a softening point of 230° C. and showed no signs of flow at this temperature.

EXAMPLE 6

To a solution of 4,4'-methylenedianiline (97.4 g., 0.5 moles) in 470 g. of N,N'-dimethylformamide was added 3,3',4,4' - benzophenone tetracarboxylic dianhydride (128.8 g., 0.4 moles) and the mixture was stirred for about 16 hours at a temperature of 25° C. To this base resin solution was added m-phenylenebismaleimide (26.8 g., 0.1 moles). Fiberglass cloth was impregnated with the resulting varnish and the prepreg converted into a sound composite by autoclave lamination at 350° F. at 90 p.s.i. The composite had 24 weight percent resin, 1% voids and could be postcured at 600° F. without suffering from dimensional instability.

EXAMPLE 7

A varnish solution was prepared in analogy to Example 6 from methylenedianiline, benzophenone tetracarboxylic dianhydride and m-phenylenebismaleimide in molar ratios of 3:2:1. Torsional braid analysis of the cured resin indicated a Tg=360° C. Films were isothermally aged at 300° C. and showed minor weight loss after 100 hours.

EXAMPLE 8

A base resin solution was prepared in analogy to Example 6 from 4,4-methylenedianiline, 2-diphenylamino-4,6-bis(m-aminoanilino)-5-triazine and 3,3',4,4'-benzophenone tetracarboxylic dianhydride in molar ratios of 5:5:8 and mixed with 2 molar equivalents of m-phenylenebismaleimide. Autoclave laminating at 350° F. and 90 p.s.i. furnished a composite with flexural strength of $66.7 \times 10^3$ p.s.i. and flexural modulus of $2.88 \times 10^6$ p.s.i. at 77° F. The samples were tested according to ASTM standard D–790.

EXAMPLE 9

To a solution of 481 g. (1.8 moles) of methylene bis (o-chloroaniline) (MOCA) in 3000 ml. of N,N-dimethylformamide was added 387 g. (1.2 moles) of benzophenone tetracarboxylic dianhydride. The mixture was stirred at 25° C. for 72 hours, then heated at reflux for four hours. The polyimide was precipitated by pouring the solution into 16 l. of water with stirring. The product was filtered, washed thoroughly with water and dried at 150° C. under vacuum yielding a base polymer which softened at 220° C.

EXAMPLE 10

The amino terminated polyimide base polymer of Example 9 was mixed in separate experiments with 1, 1.5 and 2 mole equivalents of methylenedianiline bis citraconimide. The mixtures were soluble in tetrahydrofuran, giving varnishes with solids contents of 40–50% by weight. The following resin properties were determined:

| Molar equivalents of methylenedianiline-biscitraconimide | 0 | 1 | 1.5 | 2 |
|---|---|---|---|---|
| Softening temperature, °C | 220 | 160–180 | 160 | 150 |
| *Glass transition temperature, °C. after curing at 350° C., for 30 min | | 385 | 315 | 345 |

*Determined by torsional braid analysis.

EXAMPLE 11

The amine terminated polyimide base polymer of Example 9 was mixed in separate experiments with 1, 1.5 and 2 molar equivalents of methylenedianiline bismaleimide. The mixtures were soluble in tetrahydrofuran to give varnishes with solids contents of 40 to 50% by weight. The following resin properties were determined:

| Molar equivalents of methylenedianiline bismaleimide | 0 | 1 | 1.5 | 2 |
|---|---|---|---|---|
| Softening temperature, °C | 222 | 190–200 | 165–175 | 160–165 |
| Cure time, min., at 200° C | | 30 | 17 | 16 |
| Glass transition temperature, °C., after curing at 200 °C. for 30 minutes | | 175 | 190 | 200 |
| *Glass transition temperature, °C., after curing at 350° C. for 30 minutes | | 385 | 345 | 350 |

*Determined by torsional braid analysis.

EXAMPLE 12

A mixture of 215 g. (0.6 moles) of methylene-dianiline bis maleimide, 412 g. (0.3 moles) of base polyimide of Example 10 and 950 g. tetrahydrofuran was heated at reflux for one hour, then concentrated to yield a 55% solution, which was used to impregnated (E 181 with a 1100 finish) fiberglass cloth. The dried prepreg was B-staged for 60 minutes at 311° F., then autoclave laminated at 400° F., 90 p.s.i. for two hours to give a 12 ply laminate with the following mechanical properties:

| | 77° F. |
|---|---|
| Flexural strength (ASTM standard D–790), p.s.i | $29.2 \times 10^3$ |
| Flexural modulus (ASTM Standard D–790), p.s.i | $3.25 \times 10^6$ |
| Shear strength (ASTM Standard D–2344), p.s.i | 1,721 |

After postcure to 305° C. over a 24 period the following data were obtained:

| | 77° F. | 550° F. |
|---|---|---|
| Flexural strength (ASTM Standard D–790), p.s.i | $39.0 \times 10^3$ | $47.4 \times 10^3$ |
| Flexural modulus (ASTM Standard D–790), p.s.i | $1.88 \times 10^6$ | $2.36 \times 10^6$ |
| Shear strength (ASTM Standard D–2344), p.s.i | 3,452 | 4,828 |
| Resin content, percent by wt | 24.8 | |
| Void content, percent | 0 | |
| Specific gravity | 2.11 | |

EXAMPLE 13

To a polyamic acid base polymer solution obtained by reaction of methylene bis(o-chloroaniline) with benzophenone tetracarboxylic dianhydride in mole ratios of 3:2 in tetrahydroduran was added 2 molar equivalents of methylenedianiline bismaleimide. The resulting varnish containing 50% solids was used to impregnate fiberglass cloth (E 181 with 1100 finish). The prepregs were B-staged at 150° C. for one hour, then cured at 204° C. for two hours at 90 p.s.i. The resulting 12 ply laminates were postcured at 300° C., contained 31 weight percent of resin and 0% voids. Measured at 550° F. the flexural strength was $65.8 \times 10^3$ p.s.i., the flexural modulus $3.02 \times 10^6$ p.s.i. and shear strength was 4923 p.s.i. The samples were tested according to ASTM standards described in Example 12.

EXAMPLE 14

A flask was charged with 95.04 gms. of 4,4'-diaminodiphenylmethane, 25.92 gms. of 4,4'-diaminodiphenylsulfide and 200 ml. of dimethylformamide under a nitrogen atmosphere. A slurry of 96.6 gms. of 3,4,3',4'-benzophenone tetracarboxylic dianhydride and 154.8 gms. of 4,4'-diaminodiphenylmethane bis(5-methyl nadimide) in 230 ml. of dimethylformamide was then added in portions to the reaction mixture. The reaction was continued for 4 hours. A portion of the resin was precipitated from solution by coagulation into water. The resin powder containing the flux between 170° C.–190° C.

A comparable resin prepared without the fluxing compound softened at 215° C. The resin powder containing the flux may be molded in a cavity mold at 260° C. and a pressure of about 3000 p.s.i.

EXAMPLE 15 p-Phenylene diamine is reacted with acetic anhydride to form the following compound:

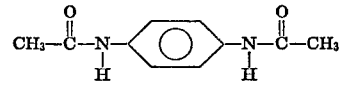

This compound is then reacted with two mole equivalents of trimellitic anhydride to form the following dianhydradie compound:

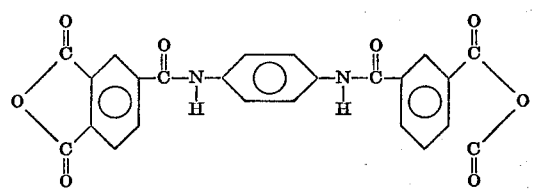

4,4'-diaminodiphenylmethane is reacted with this dianhydride in dimethylformamide and at about 25° C. The molar ratio of diamine to dianhydride being 3:2, to yield the polyamic acid precursor having the formula

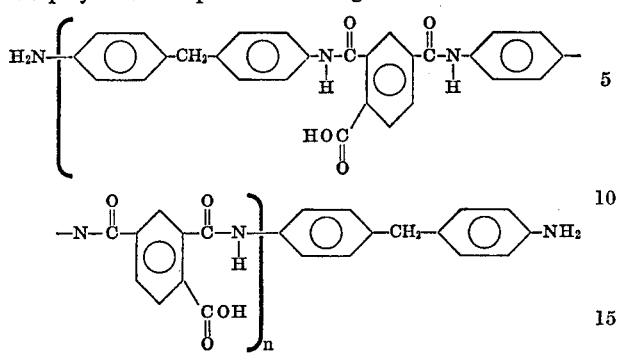

Upon heating the above polyamic acid precursor to temperatures of about 200° C., the following polyamide imide is formed:

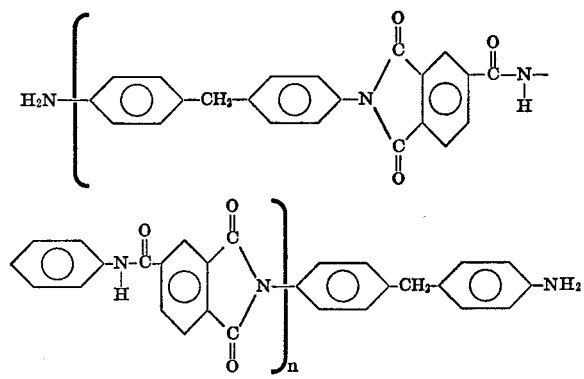

The polyamide-imide powder is obtained by coagulation of the polymer solution into water.

The polymer powder when dry mixed separately with each of the following polyolefinic compounds:

(a) 4,4′-diaminodiphenylsulfide bis(nadimide)
(b) 1,6-diaminohexane bis(nadimide)
(c) 4,4′-diaminodiphenylmethane bis(5-methyl nadimide)
(d) 4,4′-diaminodiphenylmethane bis(maleimide)
(e) 4,4′-diaminodiphenylmethane bis(dichloromaleimide)
(f) 4,4′-diaminodiphenylmethane bis(citraconeimide)
(g) 4,4′-diaminodiphenylmethane bis(oxynadimide)

at a concentration of 1 mole equivalent of polyolefinic compound per mole of resin will yield resins which soften at a lower temperature than the base resin which does not contain the polyolefinic compound.

In a similar manner, if one substitutes for the reaction product of p-phenylene diamine and acetic anhydride in the above reaction, with the compound resulting from the reaction of 4,4′-diaminodiphenylmethane and acetic anhydride, i.e.,

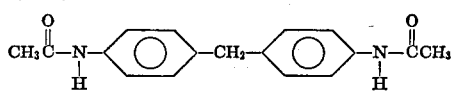

a polyamide imide is obtained having the formula

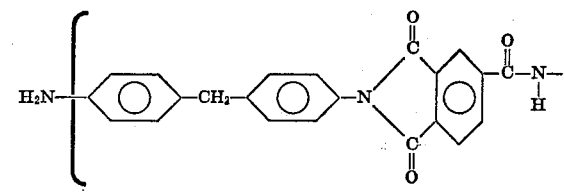

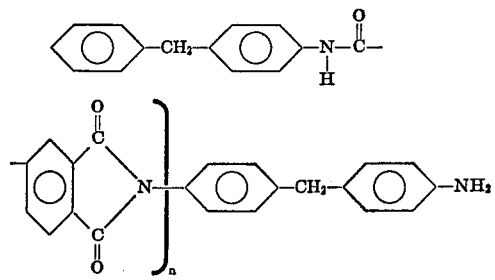

The polymer powder when dry mixed separately with each of the following polyolefinic compounds (a) 4,4′-diaminodiphenylmethane bis(nadimide)
(b) p-phenylene diamine bis(nadimide)
(c) 4,4′-diaminodiphenylether bis(5-methyl-nadmide)
(d) 4,4′-diaminodiphenylsulfide bis(maleimide)
(f) 2,4-toluenediamine bis(maleimide)
(g) 4,4′-diaminodiphenylmethane bis(dichloromaleimide)
(h) 4,4′-diaminodiphenylmethane bis(nadeimide)

at a concentration of 2 mole equivalence of polyolefinic compound per mole of resin will yield resins which soften at a lower temperature than the base resin which does not contain the polyolefinic compound.

EXAMPLE 16

To a 3 liter flask, under a nitrogen atmosphere, is added 98.14 gm. of 4,4′-diaminodiphenylmethane and 500 ml. dimethylacetamide. To the reaction mixture is added 69.49 gm. of solid trimellitic acid chloride and 325 ml. of dimethylacetamide. Stirring is continued for about 16 hours at 25° C. after which the reaction mixture is heated at 180° C. for 4 hours. A clear solution of the polyamide-imide is obtained. The polymer is coagulated into water and dried for 20 hours at 70° C. under a vacuum of 70 mm. of mercury.

The resin powder is dry mixed separately with each of the following polyolefinic compounds.

(a) 1,3-xylylene diamine bis(nadimide)
(b) 2,6-bis-(2-aminophenyl)aniline bis(5-norbornene-2,3-dicarboxylic imide)
(c) 4,4′-(p-aminophenyldisulfide)bis(5-norbornene-2,3-dicarboxylic imide)
(d) N,N′-bis{2-diphenylamino-4,6-bis(m-aminoanilino) triazine}bicyclo[2.2.1]hept-5-ene-2,3-dicarboxylic imide
(e) N,N′-p-aminophenylmethane bis(5-methyl-5-norbornene-2,3-dicarboxylic imide)
(f) 4,4′-diaminodiphenylether bis(maleimide)
(g) 4,4′-diaminodiphenylsulfide bis(maleimide)
(h) ethylenediamine bis(maleimide)

at a concentration of 1.5 mole equivalents of polyolefinic compound per mole of resin will yield resins which soften at a lower temperature than the base resin which does not contain the polyolefinic compound.

EXAMPLE 17

To a 300 ml. round bottom flask equipped with a gas inlet, stirrer, Dean-Stark trap, condensor and drying tube was added 49.5 gm. of 4,4′-diaminodiphenylmethane, 24 gm. of trimellitic anhydride, 17.5 gm. of N-methylpyrollidone, 5 gm. of xylene and drops of triphenylphosphite. The reaction mixture was heated at 160° C. for about half an hour and the temperature was raised gradually to 250° C. for 2 hours. After cooling to about 160° C., 144 gm. of N-methylpyrollidone was added to the reaction mixture. After cooling to 25° C., the amine terminated polyamide-imide was precipitated from the reaction mixture by slowly adding the reaction mixture into 2–5 liters of water with stirring. The precipitated polymer powder was washed twice with water and dried in a vacuum oven at 80° C. The polymer thus obtained softened at 150° C.–160° C. and flowed at 180° C.

The amine terminated polyamide-imide thus obtained was mixed with varying amounts of poly olefinic unsaturated imide compounds and the softening points of the compositions were determined.

| Wt. unsaturated imide | Wt. of resin, gm. | Softening temperature, °C. |
|---|---|---|
| 3.6 gm. 4,4'-diaminodiphenylmethane bis (maleimide) | 5.5 | 130-150 |
| 7.2 gm. 4,4'-diaminodiphenylmethane bis (maleimide) | 5.5 | 125-135 |
| 5.9 gm. 4,4'-diaminodiphenylmethane bis (maleimide) | 2.7 | 120-130 |
| 5.36 gm. m-phenylene-bis (maleimide) | 5.5 | 130-140 |

What is claimed is:
1. A composition of matter comprising
   (a) a polyimide resin having the formula

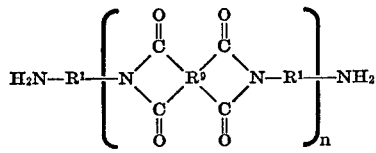

or a polyamide-imide resin having the formulas

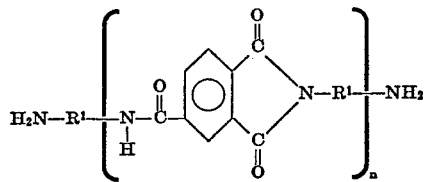

and

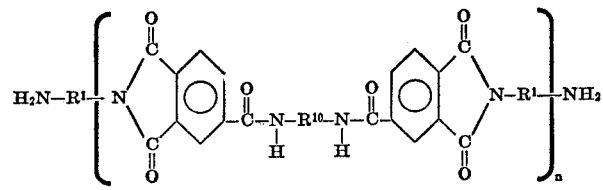

wherein
$R^9$ is a tetravalent aliphatic, cycloaliphatic, aromatic or heterocyclic radical containing at least 2 carbon atoms;
$R^1$ and $R^{10}$ are the same or different and each is an alkylene group containing from 2 to 12 carbon atoms; a cycloalkylene group containing from 4 to 6 carbon atoms; a xylylene group, an arylene group selected from phenylene, xylene, tolylene, biphenylene, naphthylene, a substituted arylene group of the formula

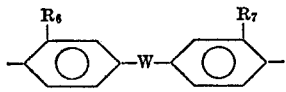

wherein W is sulfur, carbonyl, —NH, —N— (lower) alkyl, —O—, —N— phenyl, sulfonyl, an alkylene group of from 1 to 3 carbon atoms, $R^6$ and $R^7$ are independent and each is hydrogen, chloro, or bromo, (lower) alkyl containing from 1 to 5 carbon atoms, (lower) alkoxy containing from 1 to 5 carbon atoms, or

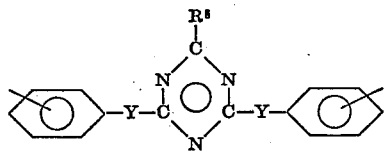

wherein Y is a covalent bond or —NH, and $R^8$ is phenyl, piperidino, H, diphenylamino or di(lower)alkyl amino; and $n$ is an integer of from 1 to 100; and (b) from about 0.5 to about 5.0 mole equivalents per mole of (a) of a polyolefinic unsaturated imide compound of the formula

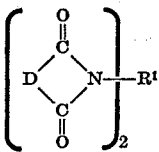

or

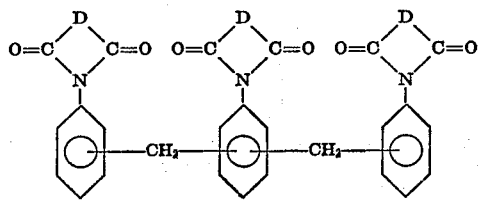

wherein
$R^1$ is an alkylene group containing from 2 to 12 carbon atoms; cycloalkylene group containing from 4 to 6 carbon atoms, a xylylene group, an arylene group selected from phenylene, tolylene, biphenylene, naphthylene, a substituted arylene group of the formula

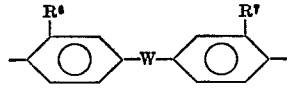

wherein W is sulfur, carbonyl, —NH, N—(lower)alkyl, —O—, —N—phenyl, sulfonyl, an alkylene group of from 1 to 3 carbon atoms, $R^6$ and $R^7$ are independent and each is hydrogen, chloro, or bromo, (lower)alkyl of from 1 to 5 carbon atoms, (lower) alkoxy containing from 1 to 5 carbon atoms, or a group having the formula

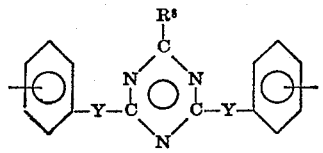

where Y is a covalent bond or —NH, and $R^8$ is phenyl, piperidino, hydrogen, diphenylamino or di(lower)alkyl-amino; D is a divalent radical containing olefinic unsaturation having the formula

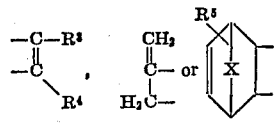

wherein
$R^3$ is hydrogen, methyl, bromo or chloro;
$R^4$ is hydrogen, bromo or chloro;
$R^5$ is hydrogen or methyl, and
X is oxygen or methylene.

2. A composition of Claim 1 wherein (b) is a polyolefinic unsaturated imide compound of the formula

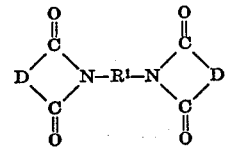

wherein
D is a divalent radical containing olefinic unsaturation having the formula

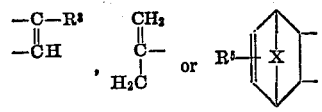

wherein
R³ is hydrogen or methyl,
R⁵ is hydrogen or methyl,
X is oxygen or methylene,
R¹ is para or meta phenylene or a group having the formula

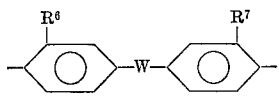

wherein W is methylene, O or S, and
R⁶ and R⁷ are independent and each is a chloro or hydrogen.

3. A composition according to Claim 1 wherein
(a) is a polyimide resin where
R¹ is meta or para phenylene, a group having the formula

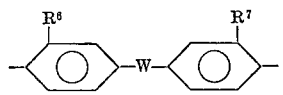

wherein W is methylene, S or O,
R⁶ or R⁷ are independent and each is a chloro or hydrogen; or a group having the formula

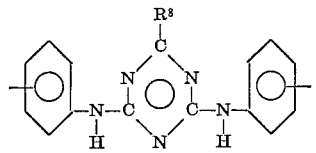

R⁹ has the formula

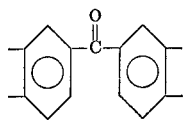

n is an integer of from 1 to 15; and
(b) is an unsaturated imide compound of the formula

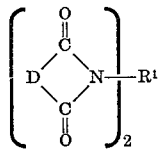

wherein
R¹ is para or meta phenylene or a group having the formula

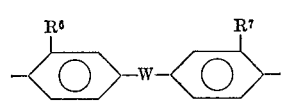

wherein W is methylene, O or S, and
R⁶ and R⁷ are independent and each is chloro or hydrogen,
D has the formula

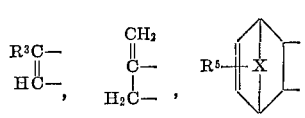

wherein
R³ is hydrogen or methyl;
R⁶ and R⁷ are independent and each is a chloro or hydrogen,
R⁵ is hydrogen or methyl, and
X is oxygen or methylene.

4. A composition according to Claim 1 wherein
(a) is a polyamide-imide resin where
R¹ is meta or para phenylene or a group having the formula

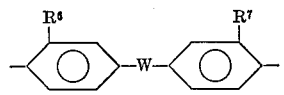

wherein W is methylene, S or —O—,
R⁶ and R⁷ are independent and each is a chloro or hydrogen,
(b) is an unsaturated imide compound of the formula

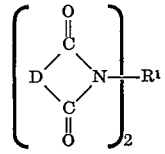

wherein
R¹ is para or meta phenylene or a group having the formula

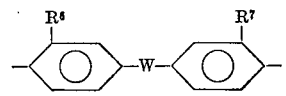

wherein W is methylene, O or S, and
R⁶ and R⁷ are independent and each is chloro or hydrogen,
D has the formula

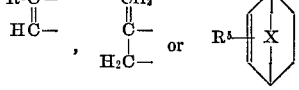

wherein
R³ is hydrogen or methyl;
R⁶ and R⁷ are independent and each is a chloro or hydrogen;
R⁵ is hydrogen or methyl, and
X is oxygen or methylene.

5. A composition according to Claim 3 wherein
(a) is a polyimide resin where R¹ is a group having the formula

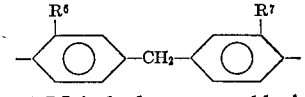

wherein R⁶ and R⁷ is hydrogen or chlorine or a group having the formula

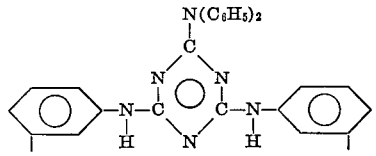

and (b) is an unsaturated imide compound wherein R¹ is m-phenylene or a group having the formula

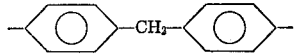

and D has the formula

6. A composition of matter comprising
(a) a prepolymer resin selected from amine terminated polyamide-acids and polyamide-amide acids of Claim 1;
(b) from about 0.5 to about 5.0 mole equivalents per mole of (a) of an unsaturated imide compound of the formula

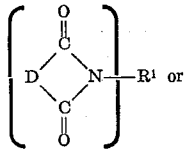

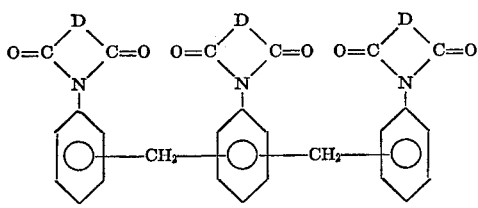

wherein
R$^1$ is an alkylene group containing from 2 to 12 carbon atoms; a cycloalkylene group containing from 4 to 6 carbon atoms, a xylylene group, an arylene group selected from phenylene, xylene, tolylene, biphenylene, naphthylene, a substituted arylene group of the formula

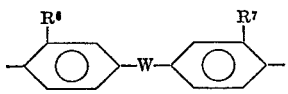

wherein W is sulfur, carbonyl, —NH, —N-(lower)alkyl, —O—, —N-phenyl, sulfonyl, an alkylene group of from 1 to 3 carbon atoms,
R$^6$ and R$^7$ are independent and each is hydrogen, chloro, bromo, (lower)alkyl containing from 1 to 5 carbon atoms, (lower)alkoxy containing from 1 to 5 carbon atoms, or a group having the formula

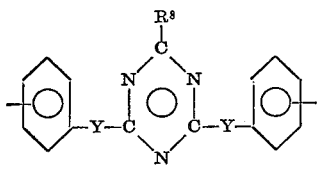

where Y is a covalent bond or —NH, and R$^8$ is phenyl, piperidino, diphenylamino or di(lower)alkyl amino;
D is a divalent radical containing olefinic unsaturation having the formula

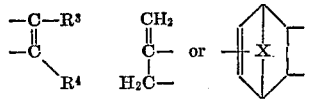

wherein
R$^3$ is hydrogen, methyl, bromo or chloro;
R$^4$ is hydrogen, bromo or chloro; and
R$^5$ is hydrogen or methyl,
X is oxygen or methylene.
7. A composition according to Claim 6 wherein (a) is a polyamide-acid resin having the formula

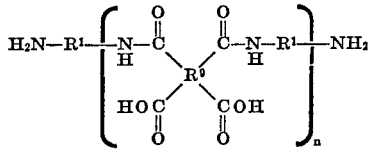

or a polyamide-amide acid having the formulas

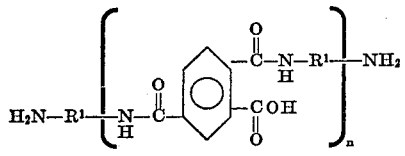

and

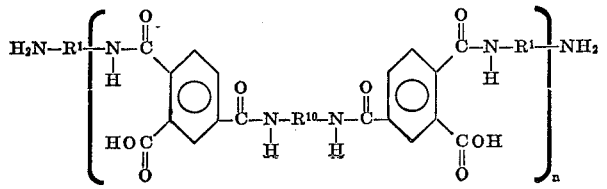

wherein
R$^9$ is a tetravalent aliphatic, cycloaliphatic, aromatic or heterocyclic radical containing at least 2 carbon atoms;
R$^1$ and R$^{10}$ are the same or different and each is an alkylene group containing from 2 to 12 carbon atoms; a cycloalkylene group containing from 4 to 6 carbon atoms; a xylene group, an arylene group selected from phenylene, xylene, tolylene, biphenylene, naphthylene, a substituted arylene group of the formula

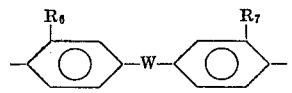

wherein W is sulfur, carbonyl, —NH, —N-(lower)alkyl, —O—, —N-phenyl, sulfonyl, an alkylene group of from 1 to 3 carbon atoms,
R$^6$ and R$^7$ are independent and each is hydrogen, chloro, or bromo, (lower)alkyl containing from 1 to 5 carbon atoms, (lower)alkoxy containing from 1 to 5 carbon atoms or a group having the formula

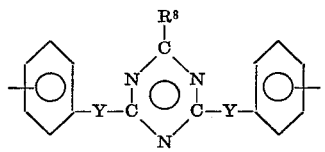

wherein Y is a covalent bond or —NH, and R$^8$ is phenyl, piperidino, diphenylamino or di(lower)alkyl amino;
n is an integer of from 1 to 100.
8. A composition according to Claim 6 wherein
(b) is a polyolefinic unsaturated imide compound of the formula

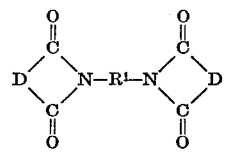

D is a divalent radical containing olefinic unsaturation having the formula

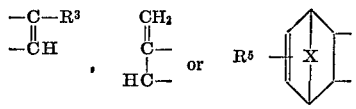

wherein
R$^1$ is para or meta phenylene or a group having the formula

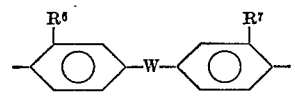

wherein W is methylene, O or S, and
R$^6$ and R$^7$ are independent and each is a chloro or hydrogen,
R$^3$ is hydrogen or methyl,
R$^5$ is methyl or hydrogen, and
X is methylene or oxygen.
9. A composition according to claim 7 wherein (a) is a polyamide-acid resin where
R$^1$ is meta or para phenylene; a group having the formula

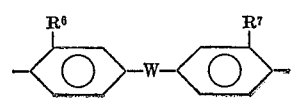

wherein W is methylene, S or O,
$R^6$ and $R^7$ are independent and each is chloro or hydrogen; or a group having the formula

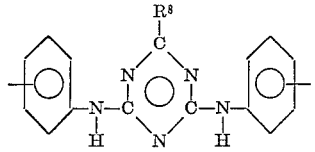

$R^9$ has the formula

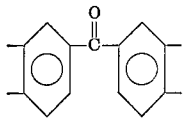

$n$ is an integer of from 1 to 15,
(b) is an unsaturated imide compound of the formula

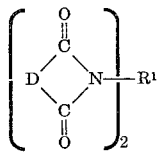

10. A composition according to claim 7 wherein (a) is a polyamide-amide acid resin where
$R^1$ is meta or para phenylene or a group having the formula

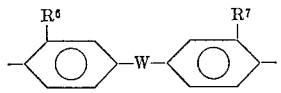

wherein W is methylene, S or —O—,
$R^6$ and $R^7$ are independent and each is a chloro or hydrogen,
(b) is an unsaturated imide compound of the formula

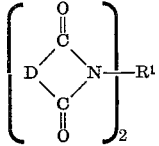

wherein
$R^1$ is para or meta phenylene or a group having the formula

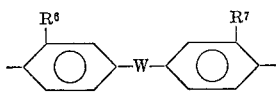

wherein W is methylene, O or S, and
$R^6$ and $R^7$ are independent and each is chloro or hydrogen,
D has the formula

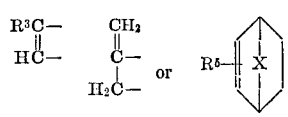

wherein
$R^3$ is hydrogen or methyl;
$R^6$ and $R^7$ are independent and each is chloro or hydrogen
$R^5$ is hydrogen or methyl, and
X is oxygen or methylene.

11. A composition according to claim 9 wherein (a) is a polyamide-acid resin where
$R^1$ is a group having the formula

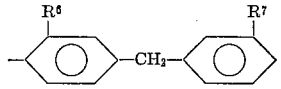

wherein $R^6$ and $R^7$ is hydrogen or chlorine or a group having the formula

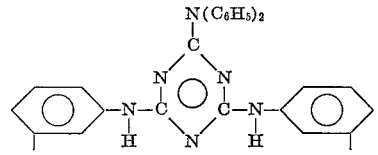

(b) is an unsaturated imide compound wherein $R^1$ is m-phenylene or a group having the formula

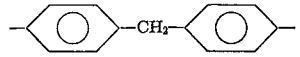

and D has the formula

wherein
$R^1$ is para or meta phenylene or a group having the formula

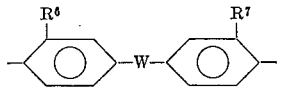

wherein W is methylene, O or S,
$R^6$ and $R^7$ are independent and each is a chloro or hydrogen,
D has the formula

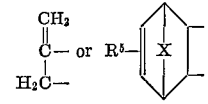

wherein
$R^3$ is hydrogen or methyl;
$R^5$ is hydrogen or methyl; and
X is oxygen or methylene.

12. A solution of a composition according to claim 1 in a volatile solvent for said composition.
13. A solution of a composition according to claim 6 in a volatile solvent for said composition.
14. A glass fabric or fiber impregnated with the composition according to claim 1.
15. A glass fabric or fiber impregnated with the composition according to claim 6.
16. A molding powder comprising the composition according to claim 1.
17. A molding powder comprising the composition of claim 6.

References Cited
UNITED STATES PATENTS

| | | | |
|---|---|---|---|
| 3,717,615 | 2/1973 | Holub | 260—857 PI |
| 3,179,633 | 4/1965 | Endrey | 260—78 TF |
| 3,179,634 | 4/1965 | Edwards | 260—78 TF |
| 3,738,969 | 6/1973 | Holub | 260—857 PA |

PAUL LIEBERMAN, Primary Examiner

U.S. Cl. X.R.
260—78 FT, 78 UA, 857 TW, 857 UN